June 26, 1951 P. J. CLEMENS 2,557,943

ADAPTABLE REPEATER IN TELEPRINTER SWITCHING SYSTEM

Filed July 1, 1947 2 Sheets-Sheet 1

*INVENTOR.*
PETRUS JOHANNES CLEMENS
*BY*
Robert Harding Jr.
*ATTORNEY*

June 26, 1951 P. J. CLEMENS 2,557,943

ADAPTABLE REPEATER IN TELEPRINTER SWITCHING SYSTEM

Filed July 1, 1947 2 Sheets-Sheet 2

INVENTOR.
PETRUS JOHANNES CLEMENS
BY
Robert Harding Jr.
ATTORNEY

Patented June 26, 1951 2,557,943

UNITED STATES PATENT OFFICE 2,557,943

ADAPTABLE REPEATER IN TELEPRINTER SWITCHING SYSTEM

Petrus Johannes Clemens, Antwerp, Belgium, assignor to International Standard Electric Corporation, New York, N. Y., a corporation of Delaware Application July 1, 1947, Serial No. 758,285
In Great Britain July 11, 1939

Section 1, Public Law 690, August 8, 1946
Patent expires July 11, 1959

2 Claims. (Cl. 178—2)

This invention relates to teleprinter exchange systems and more particularly to arrangements for repeating signals from one line to another.

The lines terminating at a teleprinter switchboard may be divided into two classes, viz. lines arranged for double current operation, which usually use separate paths for transmission in the two directions, and lines arranged for single current operation which use a single path for transmission in both directions. For a connection between a line arranged for double current operation and a line arranged for single current operation at least one repeater is required for converting double current signals into single current signals and vice-versa. For a connection between two lines each arranged for single current operation a repeater is generally used in order to permit such lines to be of the maximum length.

Teleprinter switchboards are known in which each line terminates at the exchange in an individual repeater, which is adapted to the line condition, in order to provide for uniform transmission through the exchange, generally by double current operation.

Other switchboards are also known in which lines which are arranged for single current operation are not provided with individual repeaters. Instead the connecting circuits are provided with repeaters for repeating single current signals as single current signals, so that all lines, arranged for single current operation, i. e. usually all local lines, may be interconnected by means of such connecting circuits. For connection of any such line to a line arranged for double current operation, however, a second repeater is required in the line circuit for interconnecting single current signals and double current signals. In such system, therefore, a connection between two lines, each arranged for double current operation, involves three repeaters.

According to the present invention, a telegraph repeater is provided in a connecting circuit and is automatically modified in accordance with the transmission principles of the lines with which connection is made to adapt it to repeat signals between such lines.

By this arrangement telegraph repeaters may be omitted from the termination of lines using both double and single current, though repeaters may still be necessary for long distance interchange lines.

The nature of the invention will be better understood from the following description taken in conjunction with the accompanying drawings in which.

Figure 1:
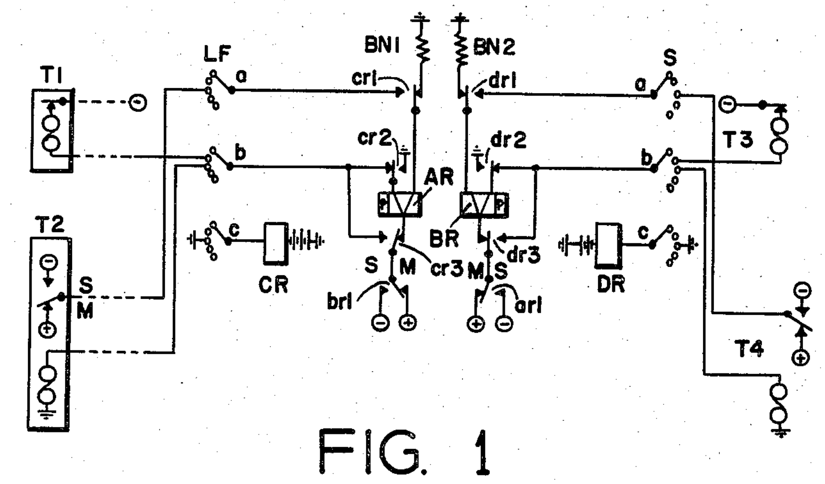
Fig. 1 shows the arrangement of a repeater in a connecting circuit in an automatic exchange system.

Referring now to Fig. 1 there is shown a connecting circuit comprising a line finder LF and a selector S, which may be a group selector or a final selector. As shown it is a line selector making contact with the terminals of subscriber's lines. Two lines T1 and T2 are shown on the left, one T1 being adapted for single current operation, and the other T2 for double current operation. Similarly lines T3 and T4 are adapted for single current and double current operation respectively. The brushes of the line finder LF and selector switch S are positioned upon terminals of the calling and called lines by well-known means (not shown). The connecting circuit comprises a repeater consisting of relays AR, and BR, and their contacts. If the brushes of the line finder LF have made contact with the terminals of line T1 and those of the selector S with the terminals of line T3, current flows through the left hand winding of relay AR from positive battery, contacts *br1* in marking position, back contacts *cr3* left hand winding of AR, back contact *cr2*, bank *b* of LF, T1, subscriber's loop, negative battery. This is opposed by current through the right-hand winding of AR, balancing network BN1 ground. The current in the left-hand winding overcomes that in the right-hand winding of AR and maintains the contacts *ar1* in marking position. Relay BR is similarly arranged. When signals are sent from station T1 by opening and closing the line circuit, the current through the left-hand winding of relay AR ceases during spacing intervals, and the current in the right-hand or biassing winding moves the contacts *ar1* into spacing position to repeat the spacing signal to substation T3. Single current signals sent from station T3 are similarly repeated to station T1.

When however, the brushes of the line finder LF make contact with the terminals of the line leading to station T2 arranged for double current operation, relay CR encounters ground on the terminal with which brush *c* makes contact and energises. At contacts *cr1*, *cr2*, and *cr3* it changes over the connections of the left-hand side of the repeater. At contacts *cr1* and *cr2*, ground over both windings of AR is connected to the sending leg of the subscriber's line, and at *cr3*, the contacts *br1* of relay BR are connected to the receiving leg of the subscriber's line. Double current signals are now sent into the line of station T2 independently of relay AR, and this relay is now adapted to respond to double current signals from the subscriber's line. If the brushes of the selector switch S make contact with a line such as T4, the relay DR is energized and alters the connections of the right-hand side of the repeater in a manner similar to that effected by relay CR for the left-hand side.

If the brushes of the line finder LF have made contact with the terminals of line T1 (a single current line) and if the selector S has made contact with the terminals of line T4 (a double current line) the following operation will take place: Brush *b* of the line finder will move to the second contact thus placing line T1 through the left-hand winding of relay AR, armature *cr3*, armature *br1*, to either plus or minus mark or space voltage. Relay AR will now operate in accordance with the impulses received over line T1. Armature *ar1* will operate between plus or minus mark or space voltage. Since selector S has moved three positions to connect with line T4, relay DR will operate over brush *c* to ground. The mark or space potential may then flow through armature *ar1*, armature *dr3*, bank *b* of selector S, line T4. Thus, with comparatively simple equipment complete versatility is achieved.

Figure 2:
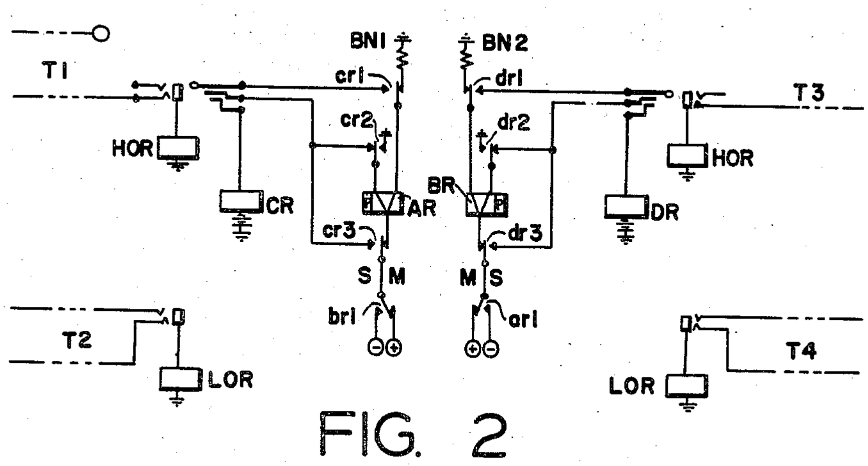
Fig. 2 shows a similar arrangement in a manual exchange system.

In Fig. 2 similar arrangements to those in Fig. 1 are shown arranged in a manually operated cord circuit. The relays CR and DR connected to the sleeves of the plugs are marginal relays and the relays HOR connected to the sleeves of the jacks of lines T1 and T3 arranged for single current operation are of high resistance. Relays CR and DR will therefore not operate in series with such relays. On the other hand relays CR and DR respectively will operate in a series with relays LOR connected to the sleeves of the jacks of lines operating with double current.

Figure 3:
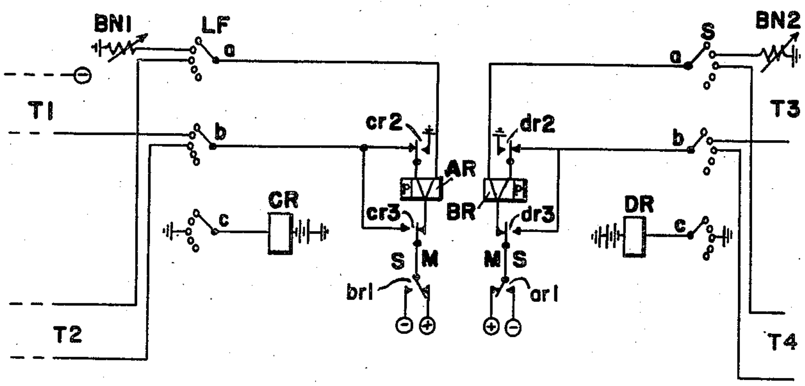
Fig. 3 shows a modification of Fig. 1 in which the balancing network of the repeater is associated with each individual line.

Fig. 3 shows how the arrangement according to the invention may be combined with the arrangement described and claimed in British Patent No. 510,306 in which balancing networks BN1 and BN2 respectively adapted to the characteristics of the lines of subscriber's T1 and T3 respectively are arranged on the line side of the line finder LF, and selector S respectively, instead of using compromise balancing networks in the cord circuit repeaters. In this case, as these balancing networks are not used for the lines of subscribers T2 and T4, the changes in the connections made by contacts *cr1* and *dr1* in Figs. 1 and 2 are made directly by the *a* brushes of the line finder LF and selector S respectively, the contacts *cr1* and *dr1* being omitted.

Figure 4:
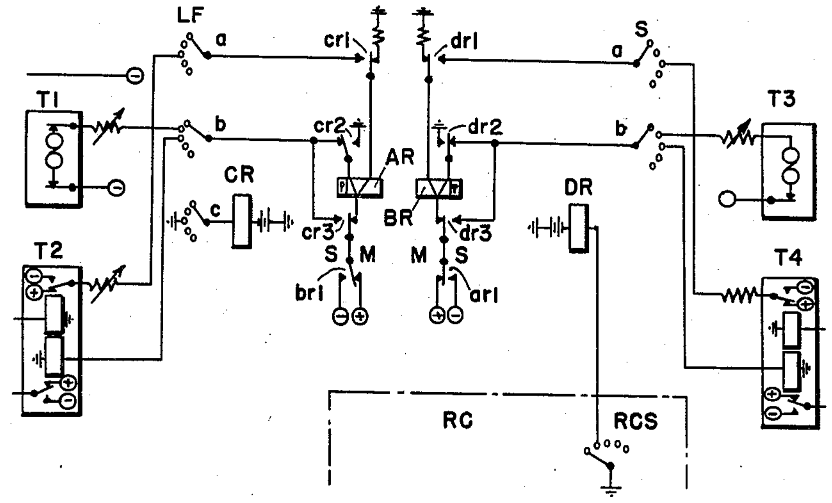
Fig. 4 shows an automatic exchange system in which the repeater on the side of the called line is modified automatically by connections from a register controller or other common control circuit.

Fig. 4 shows a modification of Fig. 1 in the case in which a circuit common to a group of connecting circuits such as a register controller RC is used to control the operation of the selector switch S. In this case, the operation of the circuit RC to determine the selection by the selector switch S of a line adapted for double current operation, such as that of subscriber T4, causes the operation of relay DR. This may be effected over contacts of a switch RCS set in accordance with the control to be exercised over the selector switch S.

Figure 5:
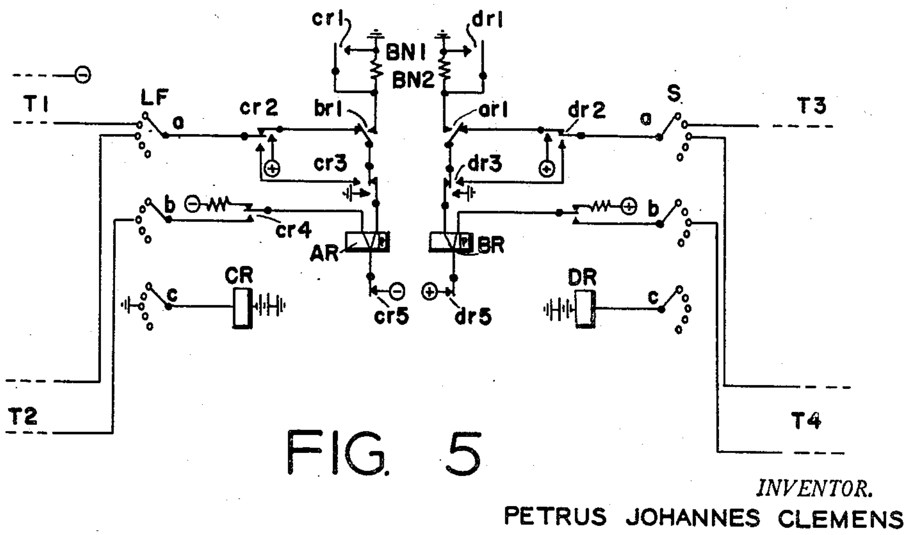
Fig. 5 shows the arrangements of Fig. 1 applied to a different type of repeater.

Fig. 5 shows the invention applied to a form of repeater different from that shown in Figs. 1 to 4. The latter is of a type commonly used in the United States of America, whereas that shown in Fig. 5 is of a type commonly used in Germany. The operation of this repeater is well known and need not therefore be described in detail. The changes brought by the operation of contacts *cr1* . . . *cr5* of relay CR and contacts *dr1* . . . *dr5* of DR in changing from single current to double current operation will also be apparent from the figure.

What I claim is:

1. A teleprinter exchange system for a plurality of teleprinter lines of double current and single current operation characteristics adapted to be interconnected by line finder and line selector switches comprising single relay repeating means disposed between said lines, said means responsive to both single current and double current operation, and means for rendering said repeating means selectively responsive to single current or double current operation, whereby teleprinter lines different current types may be coupled for the transmission of intelligence in either direction in one type of current operation and received in the other type of current operation.

2. A teleprinter exchange system as claimed in claim 1, wherein said relay means comprises a pair of relays each having an operating winding and a biassing winding, each connected at one end thereof to a common point and an armature conditioned to alternately engage a marking and a spacing contact associated with said relays for the repeating of teleprinter signals; and said means to adapt said repeating means to be responsive to signals from selected of said teleprinter lines comprises an additional pair of relays each associated respectively with one of said first-mentioned relays and each having three separate armatures, two of said armatures connected respectively to the operating winding and the biassing winding of said first-mentioned relays and conditioned to connect said winding to an energizing source in one position, and to apply a ground connection therethrough in the other position each of the third armatures of said last-mentioned relays being serially connected respectively to the armature of said first-mentioned relays disassociated therewith.

PETRUS JOHANNES CLEMENS.

REFERENCES CITED

The following references are of record in the file of this patent:

UNITED STATES PATENTS

| Number | Name | Date |
|---|---|---|
| 1,800,019 | Hewett | Apr. 7, 1931 |
| 2,249,429 | Kinkead | July 15, 1941 |

FOREIGN PATENTS

| Number | Country | Date |
|---|---|---|
| 113,428 | Australia | July 17, 1941 |